Aug. 30, 1949.  A. E. McELROY  2,480,755
CLAMPING DEVICE
Filed March 31, 1944
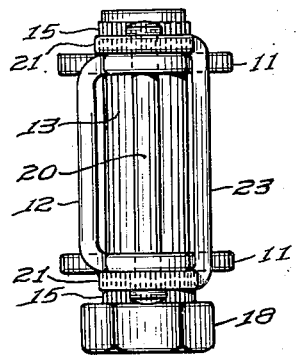
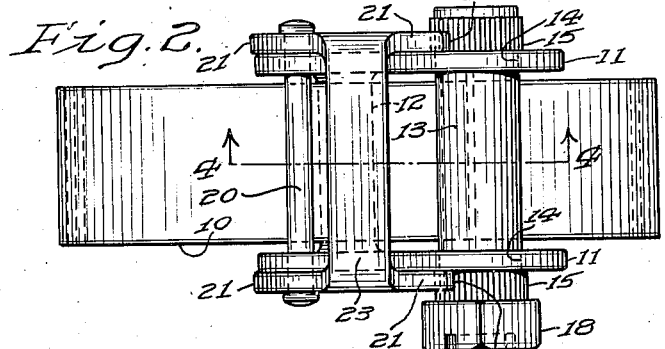
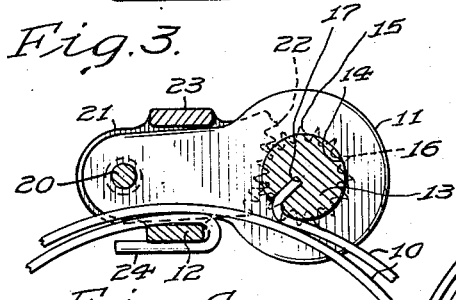
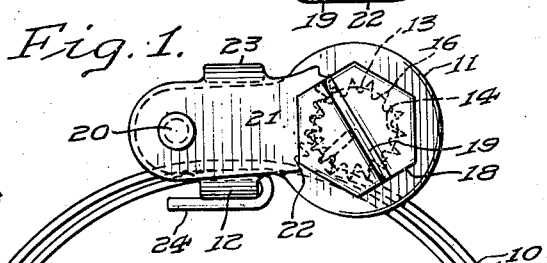
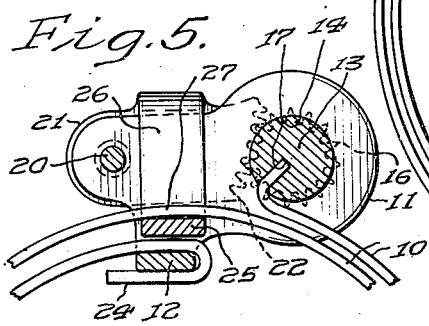
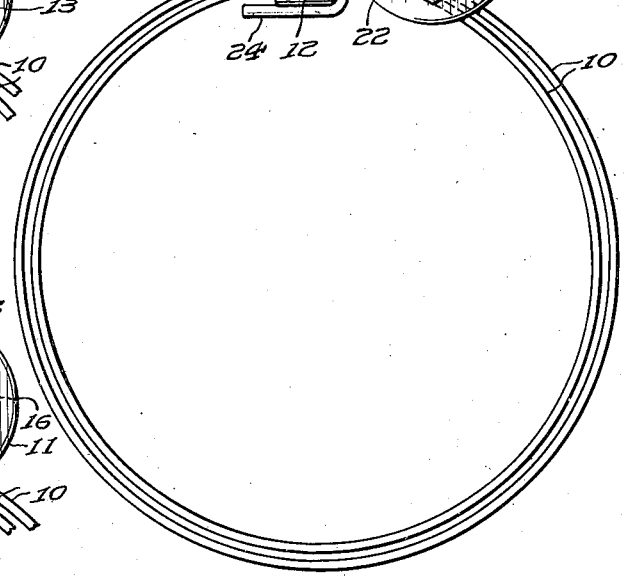
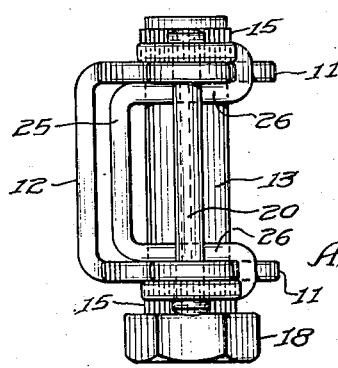
WITNESS
F. J. Hartman.
INVENTOR
Archie Edgar McElroy.
BY John D. Meyers
ATTORNEY Patented Aug. 30, 1949

2,480,755

UNITED STATES PATENT OFFICE 2,480,755

CLAMPING DEVICE

Archie Edgar McElroy, Philadelphia, Pa.

Application March 31, 1944, Serial No. 528,925

2 Claims. (Cl. 24—19)

The invention relates to a clamping device and is directed particularly to a clamp of the type in which a flexible securing band of metal or other suitable material extends around the article to be clamped and is tensioned or tightened by means of a tensioning device to which the opposite ends of the band are fastened.

The improvement has for one of its principal objects the provision of a tensioning device which is so constructed that the ends of the flexible securing band may be easily and quickly attached thereto. Another object of the invention is the provision, in such a tensioning device, of pawl and ratchet mechanism which is so constructed that the pawl may be easily and positively manipulated into engagement with ratchet teeth on the band tightening pin. A further object is the provision, in such a tensioning device, of a pawl and ratchet structure which is so designed that the pawl may not be accidentally disengaged from the ratchet teeth on the tightening pin when the device is in use. It is another object of the invention to provide a clamping device which is so constructed that the securing band employed therewith may be tensioned to any desired extent without danger of the tension being accidentally reduced when the device is in use. A further object of the invention is the provision, in such a tensioning device, of a tightening pin having ratchet teeth thereon which not only cooperate with holding pawls to retain the securing band under tension but serve as means to limit endwise movement of the tightening pin. A still further object of the invention is the provision, in such a tightening device, of a pawl which is so designed as to be positively held in cooperative engagement with the ratchet teeth when the securing band is under tension. Other objects and advantages of the improvement will be apparent from the following description taken with the accompanying drawing wherein:

Fig. 1 is a side elevational view of a form of the clamping device designed for use as a hose clamp;

Fig. 2 is a plan view of the device shown in Fig. 1;

Fig. 3 is an end view of the tensioning device shown in Figs. 1 and 2, with the securing band omitted;

Fig 4 is a sectional view through the tensioning device, taken on the line 4—4 of Fig. 2;

Fig. 5 is a sectional view similar to Fig. 4, but showing a modified form of tensioning device, and Fig. 6 is an end view of the modified form of device shown in Fig. 5, with the securing band omitted.

While the present clamping device may be employed for other purposes and may be utilized for clamping or securing other articles, it is disclosed herein in a form which is particularly adapted as a hose clamp, that is, as means for securing the end of a hose or other flexible tubular member upon a rigid connector or coupling inserted therein. As shown in the drawing, a flexible securing band 10 of sheet metal or other suitable material is designed to extend around the hose with its opposite ends attached to the tensioning device proper to which the improvement is particularly directed. The tensioning device comprises a connecting member having a pair of side plates 11, a cross bar or band attaching plate 12 integral with the side plates and extending between opposing edges thereof near one end of the device, and a tightening pin 13 spaced from the cross bar 12 and rotatably supported in the side plates. The side plates 11 and cross bar 12 are preferably formed by a punching operation.

The tightening pin 13 is constructed to fit snugly but rotatably in aligned openings 14 in the side plates, and is provided with two sets of ratchet teeth 15, one set being located on each end of the pin outside of the adjacent side plate. The teeth on the opposite ends of the pin are preferably in alignment in order to effect a more delicate adjustment of the tension in the band 10. The ratchet teeth 15 are preferably formed by a stamping or milling operation so that their sharp extremities 16 project outwardly from the surface of the pin and beyond the edges of the openings 14 so as to prevent endwise movement of the pin in the side plates 11. A slot 17 in the pin 13 serves as means to which one end of the band 10 may be connected. One end of the pin 13 may be provided with a hexagonal head 18 or a nick 19, or both, for engagement by a suitable tool in order to rotate the pin and thereby tighten the band 10.

A pivot pin 20 also extends through aligned openings in the side plates 11 and its projecting ends serve to support a pair of pawls 21 the free ends of which are provided with an arcuate row of teeth 22 for cooperating with the ratchet teeth 15. The ends of the pawl teeth 22 are preferably sharp for better cooperation with the sharp ratchet teeth 15, and the teeth on the two pawls are in alignment to accord with the aligned ratchet teeth. A connecting bar 23 integral with the pawls 21 and extending over the upper edges of side plates 11 when the device is in use serves to move the pawls in unison and also serves as a convenient means whereby the pawls may be manipulated into a position where the pawl teeth 22 may cooperate with the ratchet teeth 15. Although it is not ordinarily essential, a suitably arranged spring may be used to maintain the pawls in contact with the ratchet teeth if desired. The pawls 21 and the integral connecting bar 23 may also be formed by a punching operation.

As may be seen from Figs. 1, 4 and 5 of the drawing, when the pawls 21 are in a position to cooperate with the ratchet teeth 15, the pawls, or their active teeth 22, are substantially in alignment with the pivot pin 20 and the axis of the tightening pin 13. When so constructed, the pawls may not be accidentally disengaged from the ratchet teeth 15, thus insuring the maintenance of the tension on the securing band 10 when the device has been assembled and the band has been tightened by rotation of the pin 13.

In utilizing the form of device shown in Figs. 1 to 4 of the drawing, one end of a securing band 10 of the required length is bent into a position to form a hook 24 for engagement with the cross bar 12, or the end of the band may be attached in any other suitable manner. The band is preferably passed twice around the hose or other article in the manner indicated in Fig. 1. The opposite end of the band is then inserted in the slot 17 in the tightening pin and the latter is then rotated in a clockwise direction by means of a suitable tool until the desired tension is applied to the securing band. Reverse rotation of the tightening pin 13 will of course be prevented by the pawls 21. It will be understood, however, that the band 10 may be wrapped around the article in the reverse direction from that shown in the drawing, and that may be preferred, where the band is passed but once around the article, in order that the opposite ends of the band may overlap and clamp the article throughout its circumference.

The modified form of tensioning device illustrated in Figs. 5 and 6 differs from the form shown in Figs. 1 to 4 in that the connecting bar 25 integral with the two pawls 21 is depressed between the side plates 11 and extends between the lower ends of legs 26 the upper ends of which are connected to the pawls over the upper edges of the side plates 11. As shown in Fig. 5, this brings the connecting bar 25 into a position whereby the outer turn 27 of the band 10 may be passed thereover so as to hold the pawls 21 in operative position with respect to the ratchet teeth 15 when the band is tightened. Such a construction is a further insurance against accidental disengagement of the pawls from the ratchet teeth. In this form of the tensioning device the pawls and the integral legs 26 and connecting bar 25 may be readily made by a punching operation as in the case of the form of the device shown in Figs. 1 to 4.

While two specific forms of device in which the present improvement is incorporated have been disclosed herein, it is to be understood that the invention is not intended to be limited to the precise structure disclosed. The above description and the accompanying drawing are therefore to be regarded as illustrative only, and it is to be understood that the invention is susceptible of other forms and arrangements so long as they come within the scope of the appended claims.

What I desire to claim is:

1. In a clamp of the type wherein a flexible band extending around the object to be clamped is tensioned to tighten it, a tensioning device comprising a pair of side plates, a cross bar extending between said side plates and serving as attaching means for one end of said band, a rotatable pin mounted in said side plates and having a slot therein for receiving the opposite end of said band, an annular series of serrations integrally formed on each end of said pin outwardly of side plates and serving to prevent endwise movement of said pin in said side plates, a pawl pivoted at its outer end on each of said side plates, the inner end of each pawl being serrated and eccentric to its pivot, and engaging the serrations on the corresponding end of said pin, and tool engaging means on one end of said pin for rotating the same.

2. In a clamp of the type wherein a flexible band extending around the object to be clamped is tensioned to tighten it, a tensioning device comprising a pair of side plates, a cross bar extending between said side plates and serving as attaching means for one end of said band, a rotatable pin mounted in said side plates and having a slot therein for receiving the opposite end of said band, an annular series of serrations on each end of said pin outwardly of said side plates and serving to prevent endwise movement of said pin in said side plates, a pair of pawls pivoted at their outer ends on the outside of said side plates, the inner end of each pawl being serrated and eccentric to its pivot, and engaging the serrations on the corresponding end of said pin, rigid means extending across said side plates and interconnecting said pawls for movement in unison, and tool engaging means on said pin for rotating the same.

ARCHIE EDGAR McELROY.

REFERENCES CITED

The following references are of record in the file of this patent:

UNITED STATES PATENTS

| Number | Name | Date |
| --- | --- | --- |
| 562,015 | Morgan | June 16, 1896 |
| 642,101 | Frantz | Jan. 30, 1900 |
| 1,570,607 | Bashline | Jan. 26, 1926 |
| 1,596,193 | Kuhlman | Aug. 17, 1926 |
| 1,627,172 | Gouirand et al. | May 3, 1927 |
| 1,963,436 | Dumke | June 19, 1934 |